(12) United States Patent
Kikkawa et al.

(10) Patent No.: US 8,838,813 B2
(45) Date of Patent: Sep. 16, 2014

(54) INFORMATION PROCESSING UNIT, INFORMATION PROCESSING METHOD, REMOTE SERVER, AND INFORMATION PROCESSING SYSTEM

(75) Inventors: Norifumi Kikkawa, Tokyo (JP); Kazuhiro Shitama, Tokyo (JP)

(73) Assignee: Sony Corporation, Tokyo (JP)

( * ) Notice: Subject to any disclaimer, the term of this patent is extended or adjusted under 35 U.S.C. 154(b) by 857 days.

(21) Appl. No.: 12/406,739

(22) Filed: Mar. 18, 2009

(65) Prior Publication Data

US 2009/0240819 A1 Sep. 24, 2009

(30) Foreign Application Priority Data

Mar. 19, 2008 (JP) ................ P2008-072372

(51) Int. Cl.
| | | |
|---|---|---|
| G06F 15/16 | (2006.01) | |
| H04L 29/06 | (2006.01) | |
| H04L 29/08 | (2006.01) | |
| H04L 12/18 | (2006.01) | |

(52) U.S. Cl.
CPC ............ *H04L 63/029* (2013.01); *H04L 63/168* (2013.01); *H04L 67/02* (2013.01); *H04L 67/28* (2013.01); *H04L 12/1818* (2013.01); *H04L 67/14* (2013.01)
USPC ........................................................ 709/228

(58) Field of Classification Search
CPC ........ H04L 63/029; H04L 67/02; H04L 67/28
USPC ........................................................ 709/228
See application file for complete search history.

(56) References Cited

U.S. PATENT DOCUMENTS 6,892,240 B1 * 5/2005 Nakajima ................... 709/227

2002/0016839 A1 * 2/2002 Smith et al. .................. 709/224
2002/0161853 A1 10/2002 Burak et al.
2003/0225889 A1 12/2003 Moutafov
2004/0267937 A1 * 12/2004 Klemets ....................... 709/227

FOREIGN PATENT DOCUMENTS

| JP | 11-004259 | 1/1999 |
| JP | 2001-86163 | 3/2001 |
| JP | 2001-273211 | 10/2001 |
| JP | 2005-039820 | 2/2005 |
| JP | 2006-101431 | 4/2006 |

OTHER PUBLICATIONS

European Search Report in corresponding European application No. 09 25 0369.

* cited by examiner

*Primary Examiner* — David Lazaro
*Assistant Examiner* — Xiang Yu
(74) *Attorney, Agent, or Firm* — Finnegan, Henderson, Farabow, Garrett & Dunner, L.L.P.

(57) ABSTRACT

There is provided an information processing unit including an application execution section to execute an application to request establishment of an HTTP tunneling connection with a connection target unit, a connection establishment section to set a maximum content length settable with the connection target unit, establish an HTTP tunneling connection with the specified content length with the connection target unit via a connected proxy server and update the HTTP tunneling connection with the specified content length a plurality of times upon closure of the established connection, and a connection management section to manage connection status of each of a plurality of HTTP tunneling connections and make the application execution section recognize the plurality of HTTP tunneling connections as one virtual HTTP tunneling connection.

8 Claims, 11 Drawing Sheets

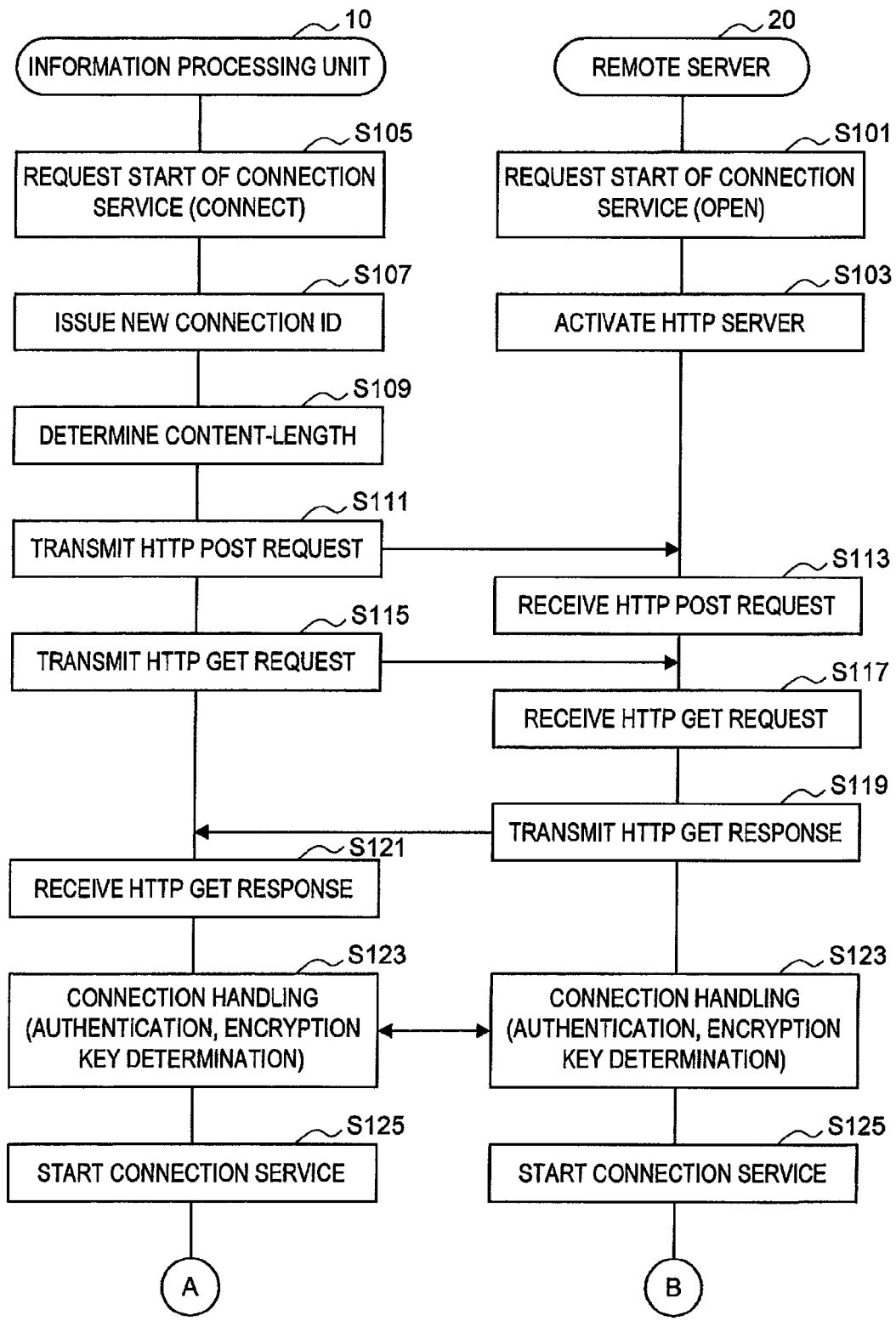

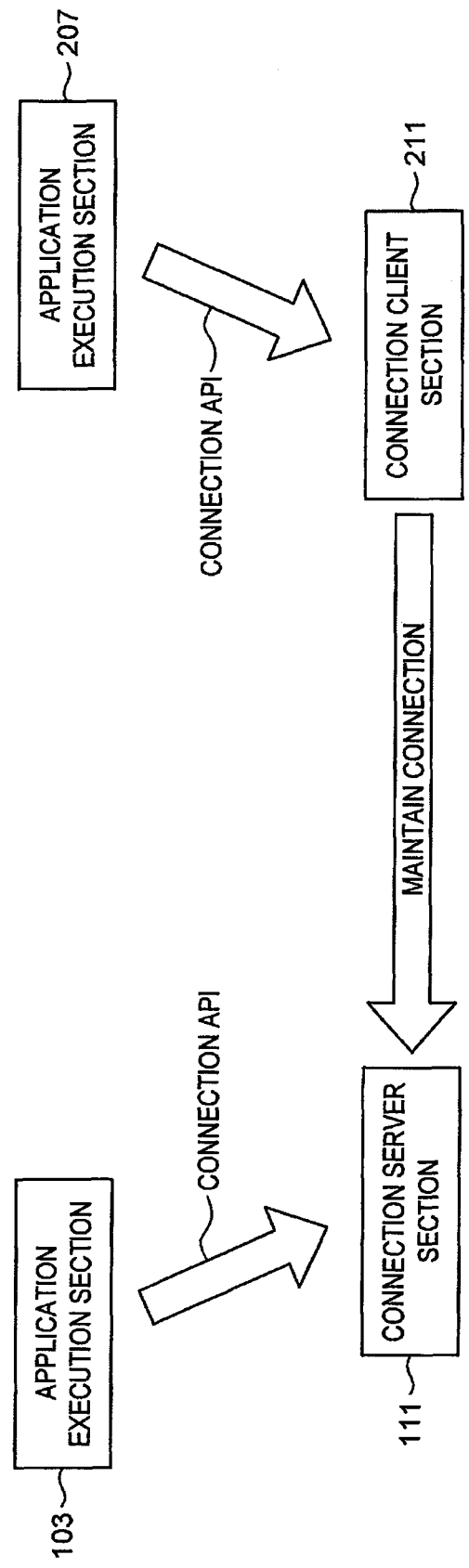

INFORMATION PROCESSING UNIT, INFORMATION PROCESSING METHOD, REMOTE SERVER, AND INFORMATION PROCESSING SYSTEM

CROSS-REFERENCE TO RELATED APPLICATION

The present invention contains subject matter related to Japanese Patent Application JP 2008-072372 filed in the Japan Patent Office on Mar. 19, 2008, the entire contents of which being incorporated herein by reference.

BACKGROUND OF THE INVENTION

1. Field of the Invention

The present invention relates to an information processing unit, an information processing method, a remote server and an information processing system.

2. Description of the Related Art

As a method of connecting a server and a client device by remote access over the Internet, a technique called HTTP tunneling is known (cf. e.g. Japanese Patent Application Publication No. 2001-86163).

SUMMARY OF THE INVENTION

However, in order to establish a connection through remote access using HTTP tunneling, it is necessary to grasp the amount of transfer data at the time of establishing a connection. Therefore, configuration is complicated when establishing a connection by remote access using HTTP tunneling.

In light of the foregoing, it is desirable to provide an information processing unit, an information processing method, a remote server and an information processing system capable of establishing and maintaining a connection using HTTP tunneling between a remote server and an information processing unit via a proxy server without the need to grasp the amount of transfer data.

According to an embodiment of the present invention, there is provided an information processing unit including an application execution section to execute an application to request establishment of an HTTP tunneling connection with a connection target unit, a connection establishment section to set a maximum content length settable with the connection target unit, establish an HTTP tunneling connection with the specified content length with the connection target unit via a connected proxy server and update the HTTP tunneling connection with the specified content length a plurality of times upon closure of the established connection, and a connection management section to manage connection status of each of a plurality of HTTP tunneling connections and make the application execution section recognize the plurality of HTTP tunneling connections as one virtual HTTP tunneling connection.

In this configuration, the application execution section executes an application to request establishment of an HTTP tunneling connection with the connection target unit. The connection establishment section sets a maximum content length settable with the connection target unit, establishes an HTTP tunneling connection with the specified content length via the connected proxy server and updates the HTTP tunneling connection with the specified content length a plurality of times upon closure of the established connection. Further, the connection management section manages connection status of each of a plurality of HTTP tunneling connections and makes the application execution section recognize the plurality of HTTP tunneling connections as one virtual HTTP tunneling connection.

The connection management section may manage a connection identifier associated with the virtual HTTP tunneling connection and specify the connection identifier associated with the virtual HTTP tunneling connection to the connection establishment section when the connection establishment section updates the HTTP tunneling connection with the specified content length, and the connection establishment section may update the HTTP tunneling connection by using the connection identifier specified by the connection management section.

The connection establishment section may update the HTTP tunneling connection with the specified content length by reusing a connection control condition set for the HTTP tunneling connection before update.

According to another embodiment of the present invention, there is provided an information processing method including the steps of setting a maximum content length settable with a connection target unit based on a request from an application for establishment of an HTTP tunneling connection with the connection target unit and establishing an HTTP tunneling connection with the specified content length with the connection target unit via a connected proxy server, updating the HTTP tunneling connection with the specified content length upon closure of the established HTTP tunneling connection, and managing connection status of HTTP tunneling connections before and after update and making the application recognize the HTTP tunneling connections before and after update as one virtual HTTP tunneling connection.

According to yet another embodiment of the present invention, there is provided a remote server including an application execution section to execute an application to await a request for establishment of an HTTP tunneling connection supplied from an information processing unit, a connection establishment section to supply a maximum content length settable to the information processing unit, establish an HTTP tunneling connection with the specified content length with the information processing unit connected via a proxy server, and re-establish the connection when a request for update of the connection is supplied from the information processing unit upon closure of the established connection, and a connection management section to manage connection status of a plurality of HTTP tunneling connections and make the application execution section recognize the plurality of HTTP tunneling connections as one virtual HTTP tunneling connection.

According to still another embodiment of the present invention, there is provided an information processing method including the steps of executing an application to await a request for establishment of an HTTP tunneling connection supplied from an information processing unit, supplying a maximum content length settable to the information processing unit and establishing an HTTP tunneling connection with the specified content length with the information processing unit connected via a proxy server, re-establishing the connection when a request for update of the connection is supplied from the information processing unit upon closure of the established connection, and managing connection status of HTTP tunneling connections before and after update and making the application recognize the HTTP tunneling connections before and after update as one virtual HTTP tunneling connection.

According to yet another embodiment of the present invention, there is provided an information processing system including the above-described information processing unit and the above-described remote server.

The virtual HTTP tunneling connection may be established from the information processing unit to the remote sever, and the plurality of HTTP tunneling connections may be established from the remote server to the information processing unit.

According to the embodiments of the present invention described above, it is possible to establish and maintain a connection using HTTP tunneling between a remote server and an information processing unit via a proxy server without the need to grasp the amount of transfer data.

BRIEF DESCRIPTION OF THE DRAWINGS

FIG. 5A is a flowchart illustrating an information processing method according to the embodiment.

FIG. 6 is an explanatory view illustrating a reverse connection according to the embodiment.

DETAILED DESCRIPTION OF THE PREFERRED EMBODIMENTS

Figure 1:
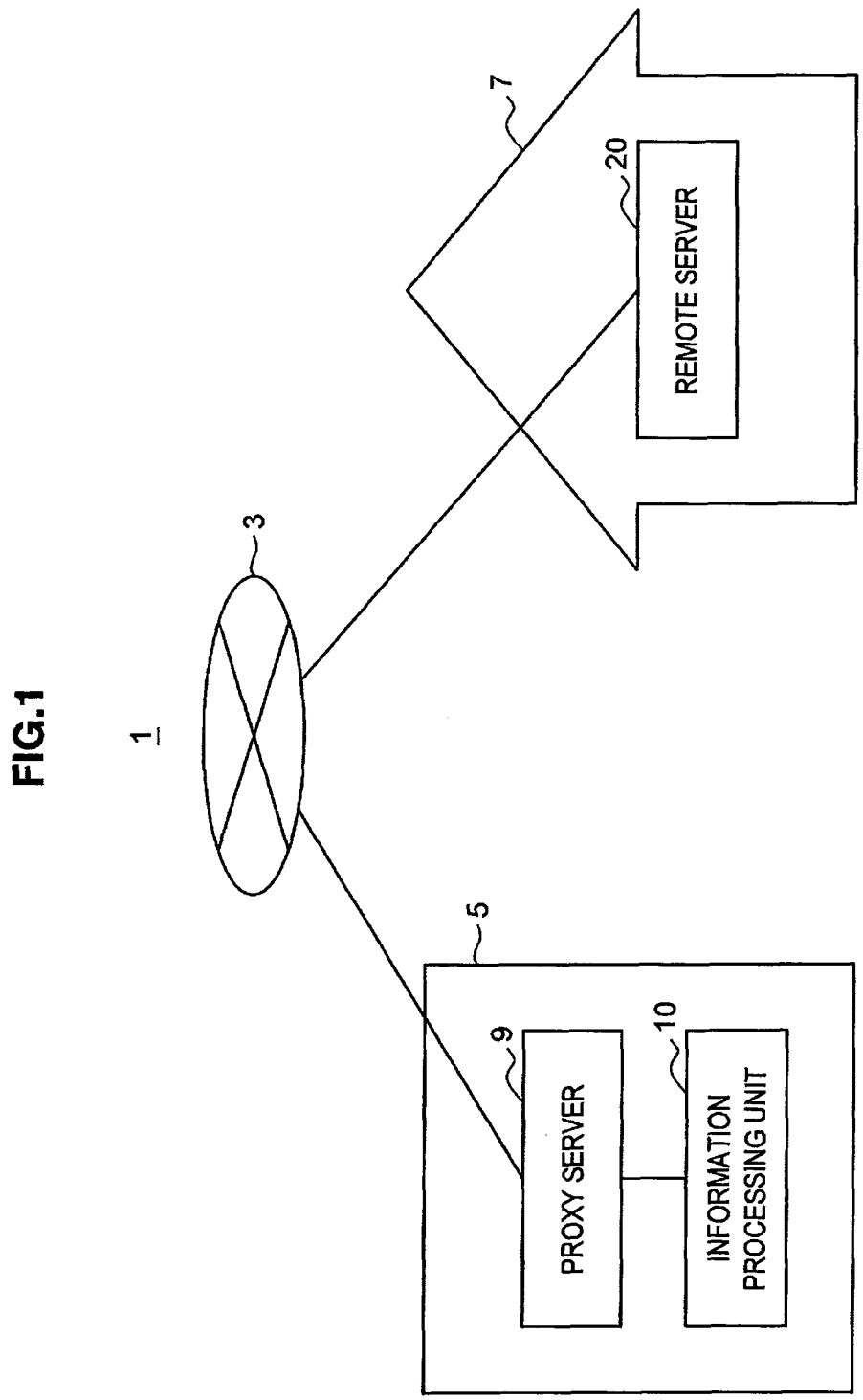
FIG. 1 is an explanatory view illustrating an information processing system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.
<Connection by HTTP Tunneling>

Before describing an information processing system according to a first embodiment of the present invention, a connection using HTTP tunneling will be explained in detail. In order to address the above-described issue, the inventors of the present invention have conducted in-depth studies about a connection by HTTP tunneling firstly. The result of the studies is described hereinafter with reference to FIGS. 9A to 9D. FIGS. 9A to 9D are explanatory views illustrating connections using HTTP tunneling.

A method for establishing a connection by HTTP tunneling between a server and a client device over the Internet is as follows. In this case, it is necessary for a transaction on the POST side of HTTP tunneling to use either one of a method that designates a content-length header or a method that uses chunked encoding.

Figure 9A:
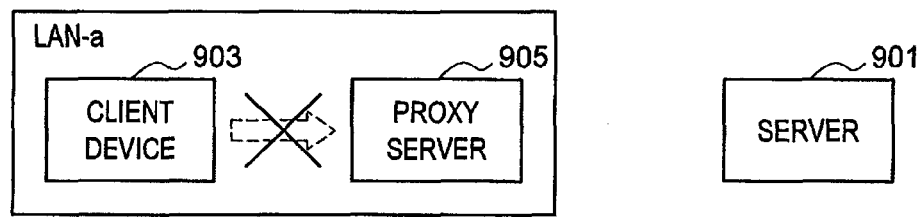
FIG. 9A is an explanatory view illustrating HTTP tunneling.

If a proxy server 905 is placed in the environment of a client device 903 (specifically, a LAN to which the client device 903 belongs) as shown in FIG. 9A, for example, the method using chunked encoding is not supported by the proxy server 905 regarding a transaction on the HTTP POST side in some cases. On the other hand, it is necessary in the method using a content length header to grasp the amount of transfer data (which is referred to hereinafter also as a content length) at the time of establishing a connection. Therefore, the method using a content length header is difficult in the case of using a POST transaction as a communication channel like HTTP tunneling.

Figure 9B:
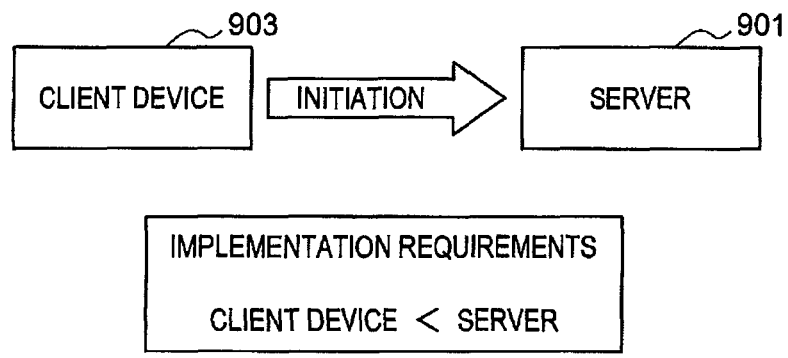
FIG. 9B is an explanatory view illustrating HTTP tunneling.

Typically in a connection, requirements for implementation conditions and environments are often higher in a device to await a connection (e.g. a server 901 in FIG. 9B) than in a device to initiate a connection (e.g. the client device 903 in FIG. 9B) as shown in FIG. 9B, for example. For instance, in the case of remote access, although it, is necessary to apply NAT Transversal technology such as UPnP IGD when Network Address Translation (NAT) is used at the server 901 end, the existence of NAT does not become an issue at the client device 903 end.

Figure 9C:
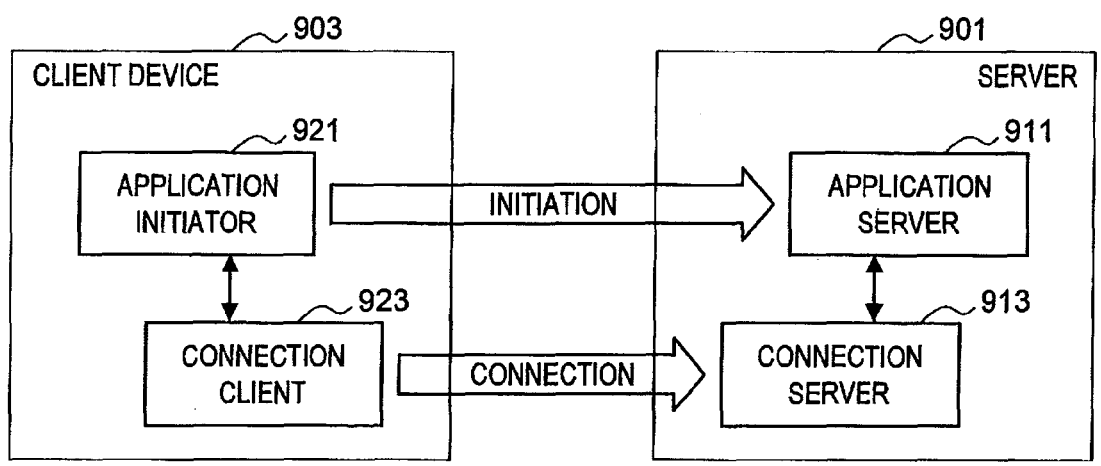
FIG. 9C is an explanatory view illustrating HTTP tunneling.

Further, in the case of establishing a connection from the client device 903 to the server 901, it is often the case that an application of the client device 903 requests establishment of a connection to an application of the server 901 as shown in FIG. 9C, for example. Specifically, an application initiator 921 of the client device 903 performs initiation of a connection to an application server 911 of the server 901. In this case, upon operation of the application initiator 921, a connection client 923 of the client device 903 actually makes a request for establishing a connection to a connection server 913 of the server 901.

In the vast majority of cases, the initiator of the application operation is a client of a connection, and the direction of an HTTP transaction coincides with the direction of initiating a connection in the application as described above. Examples of such cases are when the client device 903 is a Web browser and the server 901 is a Web server, when the client device 903 is a digital media player compliant with the digital living network alliance (DLNA) guideline and the server 901 is a digital media server compliant with the DLNA guideline, and so on.

Figure 9D:
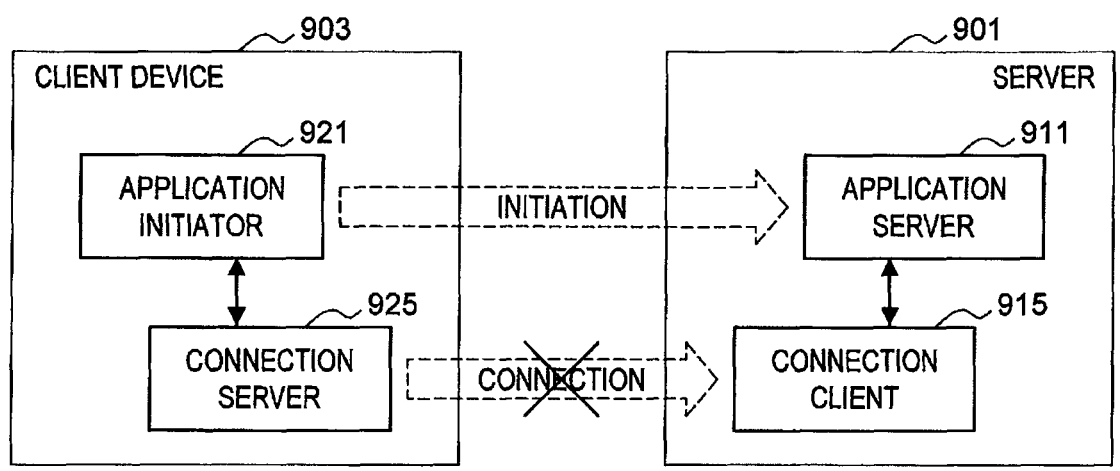
FIG. 9D is an explanatory view illustrating HTTP tunneling.

However, there is a case where constraints on the installation environment of the server 901 do not allow placement of a connection server and only allows placement of a connection client 915 as shown in FIG. 9D, for example. In such a case, if the application initiator 921 of the client device 903 requests initiation of a connection to the application server 911 of the server 901, the direction of an HTTP transaction does not coincide with the direction of initiating a connection in the application, thus failing to establish a connection between the client device 903 and the server 901.

The inventors of the present invention have conducted intensive studies in order to overcome the above issue and have found the information processing system as described below.
(First Embodiment)
<Information Processing System>

An information processing system according to a first embodiment of the present invention is described hereinafter in detail with reference to FIG. 1. FIG. 1 is an explanatory view illustrating an information processing system according to the embodiment.

An information processing system 1 according to the embodiment includes a network 5 to which an information processing unit 10 according to the embodiment belongs and a network 7 to which a remote server 20 according to the embodiment belongs. The network 5 to which the information processing unit 10 belongs and the network 7 to which the remote server 20 belongs can be connected to each other through the Internet 3. Further, a proxy server (HTTP proxy) 9 is installed in the network 5 to which the information processing unit 10 belongs.

The information processing unit 10 and the remote server 20 according to the embodiment each have a remote access function, and they can communicate with each other using the HTTP tunneling technique.

The Internet 3 is a communication network that connects the information processing unit 10 and the remote server 20 so as to enable two-way communication or one-way communication by wired or wireless means. The proxy server 9 is an HTTP proxy that functions as a firewall, which is placed between the Internet 3 and the information processing unit 10.

The information processing unit 10 and the remote server 20 are devices having a remote access function, and various functions can be implemented by executing upper layer applications that are installed in the devices. The information processing unit 10 and the remote server 20 may be computer devices such as a personal computer and a server or home information appliances having a communication function through a network such as a TV set, a DVD/HDD recorder, a cellular phone, a personal digital assistant (PDA), a digital camera, a home video game machine and a digital video camera. Further, the information processing unit 10 and the remote server 20 may be portable devices that can be carried by a contractor such as a portable video game player, a PHS and a portable video/audio player. Furthermore, the information processing unit 10 and the remote server 20 may be a digital media server (DMS), a digital media player (DMP), a digital media renderer (DMR), a digital media controller and so on conforming to the DLNA guideline.

The information processing unit 10 and the remote server 20 are described in further detail below.

<Configurations of the Information Processing Unit and the Remote Server>

Figure 2:
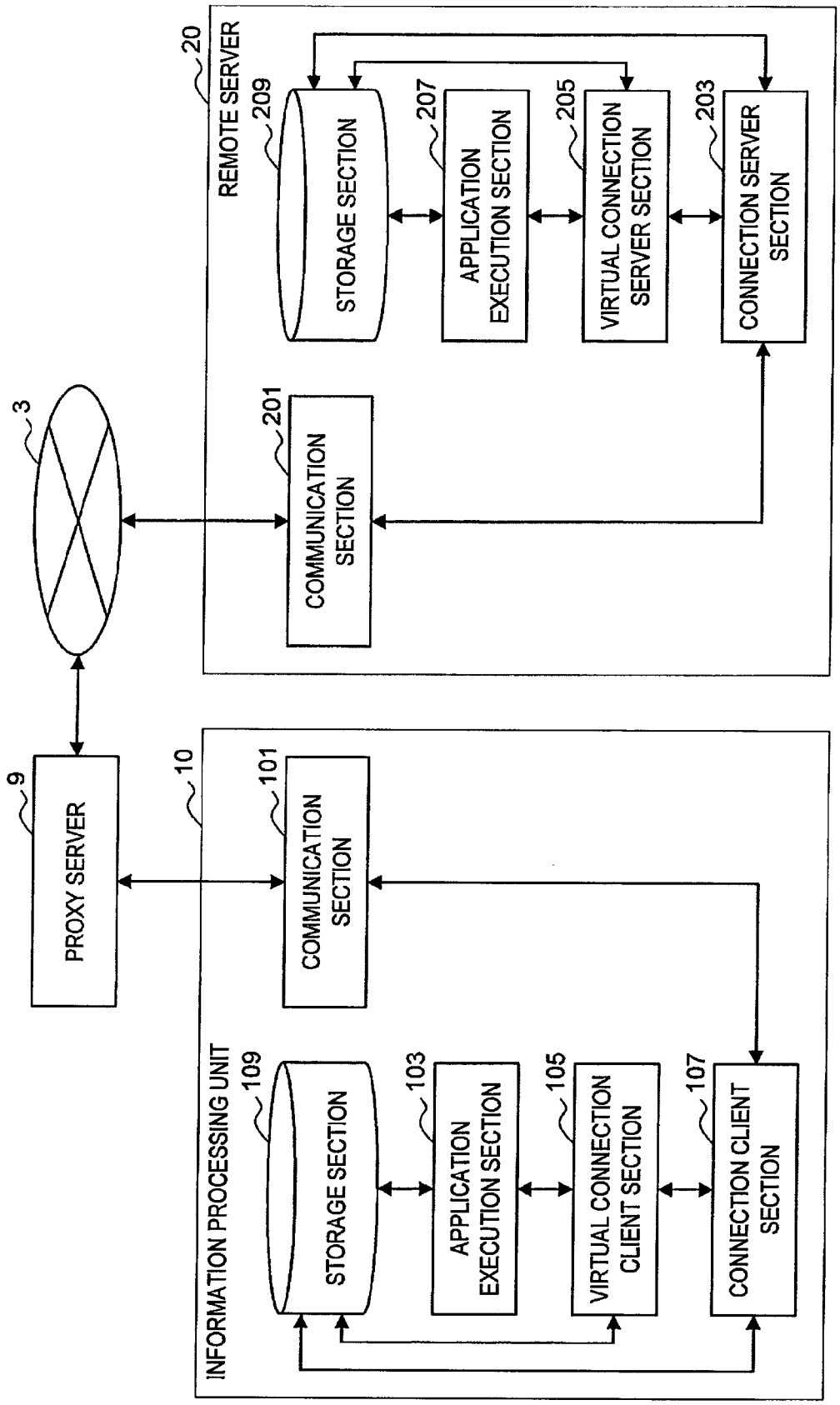
FIG. 2 is a block diagram illustrating the configurations of an information processing unit and a remote server according to the embodiment.

The configurations of the information processing unit 10 and the remote server 20 according to the embodiment are described hereinafter in detail with reference to FIG. 2. FIG. 2 is a block diagram illustrating the configurations of the information processing unit 10 and the remote server 20 according to the embodiment.

The example in FIG. 2 illustrates the case where the information processing unit 10 is connected as a client device to the remote server 20.

[Configuration of the Information Processing Unit 10]

The information processing unit 10 according to the embodiment mainly includes a communication section 101, an application execution section 103, a virtual connection client section 105, a connection client section 107 and a storage section 109 as shown in FIG. 2, for example.

The communication section 101 is a processing section that is composed of a central processing unit (CPU), read only memory (ROM), random access memory (RAM), a communication device and so on, for example, and further includes a network interface. The communication section 101 is a stack capable of performing communication control based on two types of protocols: transmission control protocol (TCP) and internet protocol (IP). The information processing unit 10 according to the embodiment communicates with a device belonging to the same network or a device belonging to a different network via the communication section 101.

The application execution section 103 is composed of a CPU, ROM, RAM and so on, for example, and implements various processing that function as upper layer applications by executing programs recorded in the storage section 109, which is described later on the CPU. The upper layer applications first initiate a connection from the information processing unit 10 according to the embodiment to the remote server 20, which is described later, and then execute various processing using the established connection.

Specifically, when the application execution section 103 determines initiation of a connection, notification is provided to the virtual connection client section 105, which is described later, and the process of establishing an actual connection is started.

One example of such upper layer applications is various kinds of control programs conforming to the DLNA guideline.

The virtual connection client section 105, which is an example of a connection management section, is composed of a CPU, ROM, RAM and so on, for example, and directs the connection client section 107, which is described later, to make a request for establishment of an actual connection based on a connection initiation request transmitted from the application execution section 103. Further, when am HTTP tunneling connection is established with the remote server 20 by the connection client section 107, which is described later, the virtual connection client section 105 manages the connection status of the established connection.

Specifically, the virtual connection client section 105 causes the application execution section 103 to recognize a plurality of HTTP tunneling connections that are established by the connection client section 107, which is described later, as one virtual HTTP tunneling connection. The application execution section 103 can thereby provide various instructions to the virtual HTTP tunneling connection without concern for the way the actual HTTP tunneling connection is realized.

The virtual HTTP tunneling connection is associated with a connection ID, which is a unique connection identifier, and the virtual connection client section 105 records the connection ID into the storage section 109, which is described later. The same connection ID is assigned to a plurality of connections that form the virtual HTTP tunneling connection.

The connection ID is issued by the virtual connection client section 105 of the information processing unit 10 when an HTTP tunneling connection is established for the first time. Further, when the connection client section 107, which is described later, updates the HTTP tunneling connection, the connection ID managed by the virtual connection client section 105 is notified to the connection client section 107.

The connection ID may be assigned not only to a transaction of HTTP POST but also to a transaction of HTTP GET.

The connection client section 107, which is an example of a connection establishment section, is composed of a CPU, ROM, RAM and so on, for example. The connection client section 107 requests establishment of a connection using HTTP tunneling to a connection establishment section placed in the remote server 20 based on a connection establishment request transmitted from the virtual connection client section 105. Further, once a connection is established with the remote server 20, the connection client section 107 maintains the established connection. The establishment and maintenance of a connection are performed via the communication section 101.

The connection client section 107 determines a content length by conference with a connection server section 203 of the remote server 20 and establishes remote access using HTTP tunneling with the remote server 20 by the method specifying a content length header.

If the content length exceeds a previously specified content length, the HTTP tunneling connection established with the remote server 20 is closed, and the connection client section 107 automatically updates the HTTP tunneling connection with the specified content length with the remote server 20. Upon update, the connection client section 107 reuses the connection ID that has been notified from the virtual connection client section 105.

When establishing an actual connection with the connection server section 203 of the remote server 20, connection control condition such as two-way authentication and an encryption key to be used for communication is determined. Further, when updating the HTTP tunneling connection, the connection client section 107 can update the connection by reusing the connection control condition that has been determined for the HTTP tunneling connection before update. For example, only two-way authentication may be performed with the remote server 20 and the encryption key or the like that has been used for the connection before update may be reused at the time of updating the connection, so that the connection can be updated more quickly than when establishing the connection for the first time.

The storage section 109 is capable of storing various parameters, the progress of processing and so on that are necessary to be stored when the information processing unit 10 according to the embodiment performs some processing, various databases, or the like. Further, in the storage section 109, the connection ID that is managed by the virtual connection client section 105 is recorded in the format of log information, database or the like, for example. Data reading and wiring can be made freely on the storage section 109 by the communication section 101, the application execution section 103, the virtual connection client section 105, the connection client section 107 and so on.

Although the case where the information processing unit 10 includes the connection client section 107 is described above, the information processing unit 10 may include a connection server section like the one placed in the remote server 20, which is described later.

One example of the functions of the information processing unit 10 according to the embodiment is described in the foregoing. Each of the above-described elements may be configured using a general-purpose member or circuit, or it may be configured by hardware specialized to the function of each element. Further, the function of each element may be entirely realized by CPU or the like. It is thereby possible to change the configuration to use as appropriate according to the technique level when implementing the embodiment.

[Configuration of the Remote Server 20]

The remote server 20 according to the embodiment mainly includes a communication section 201, a connection server section 203, a virtual connection server section 205, an application execution section 207, and a storage section 209 as described in FIG. 2, for example.

The communication section 201 is a processing section that is composed of a CPU, ROM, RAM, a communication device and so on, for example, and further includes a network interface. The communication section 201 is a stack capable of performing communication control based on two types of protocols: TCP and IP. The remote server 20 according to the embodiment communicates with a device belonging to the same network or a device belonging to a different network via the communication section 201.

The connection server section 203, which is an example of a connection establishment section, is composed of a CPU, ROM, RAM and so on, for example. The connection server section 203 establishes a connection with the information processing unit 10 in response to a request for establishment of an HTTP tunneling connection that is transmitted from the connection establishment section of the information processing unit 10. Further, once a connection is established with the information processing unit 10, the connection server section 203 maintains the established connection. The establishment and maintenance of a connection are performed via the communication section 201.

The connection server section 203 determines a content length by conference with the connection establishment section (e.g. the connection client section 107) of the information processing unit 10 and establishes remote access using HTTP tunneling with the information processing unit 10 by the method specifying a content length header.

Further, a connection ID, which is an example of a connection identifier, is described as a query string in URL of HTTP POST that is transmitted from the connection client section 107 of the information processing unit 10. The connection server section 203 transfers the described connection ID to the virtual connection server section 205, which is described later.

If the content length exceeds a previously specified content length, the connection server section 203 closes the HTTP tunneling connection that has been established with the information processing unit 10. When the HTTP tunneling connection established with the information processing unit 10 is closed, the information processing unit 10 may make a request for the HTTP tunneling connection again. If a request for re-establishing the connection which has been closed (request for connection update) is made, the connection server section 203 transfers the connection ID transmitted from the information processing unit 10 to the virtual connection server section 205, which is described later, and performs connection establishment processing according to determination by the virtual connection server section 205.

When establishing an actual connection with the connection client section 107 of the information processing unit 10, a connection control condition such as two-way authentication and an encryption key to be used for communication is determined. Further, when updating the HTTP tunneling connection, the connection can be updated by reusing the connection control condition that has been determined for the HTTP tunneling connection before update. For example, when it is notified from the virtual connection server section 205, which is described later, that the same connection ID as that for the connection requested to be updated exists, only two-way authentication may be performed with the information processing unit 10 and the encryption key or the like that has been used for the connection before update may be reused.

The virtual connection server section 205, which is an example of a connection management section, is composed of a CPU, ROM, RAM and so on, for example, and manages the connection status of the connection established between the connection server section 203 and the connection client section 107 of the information processing unit 10.

Specifically, the virtual connection server section 205 makes the application execution section 207 recognize a plurality of HTTP tunneling connections that are established by the connection server section 203 as one virtual HTTP tunneling connection. The application execution section 207 can thereby provide various instructions to the virtual HTTP tunneling connection without concern for the way the actual HTTP tunneling connection is realized.

Further, the virtual connection server section 205 records the connection ID that is transferred from the connection server section 203 into the storage section 209, which is described later. The connection ID is recorded in the storage section 209 or the like without being deleted for a prescribed length of time from the end of the connection due to the completion of the content length. The prescribed length of time from the end of the connection may be set to an arbitrary value according to the capacity and scale of the information processing system 1, and it may be set to a value such as one minute.

If it is notified from the connection server section 203 that there is a request for connection update, the virtual connection server section 205 determines whether the newly transferred connection ID is the same as the connection ID that is recorded in the storage section 209 or the like. If it is determined that the connection IDs match, the virtual connection server section 205 determines that the connection for which the update request is made is the one that the connection which has been closed due to the completion of the content length is updated, and treats it as the one belonging to the same virtual HTTP tunneling connection. If, on the other hand, the connection IDs do not match, the virtual connection server section 205 determines that a new virtual HTTP tunneling connection has occurred.

If the same connection ID is stored in the storage section 209, the virtual connection server section 205 notifies that to the connection server section 203. Consequently, the connection server section 203 may perform only two-way authentication with the information processing unit 10 and reuse the encryption key or the like that has been used for the connection before update as described earlier. It is thereby possible to reduce a time necessary for updating the connection with the information processing unit 10.

The application execution section 207 is composed of a CPU, ROM, RAM and so on, for example, and implements various processing that function as upper layer applications by executing programs recorded in the storage section 209, which is described later, on the CPU. The upper layer applications first await initiation of a connection to be transmitted from the information processing unit 10 according to the embodiment and, once the connection is established, execute various processing using the established connection.

One example of such upper layer applications is various kinds of control programs conforming to the DLNA guideline.

The storage section 209 is capable of storing various parameters, the progress of processing and so on that are necessary to be stored when the remote server 20 according to the embodiment performs some processing, various databases, or the like. Further, in the storage section 209, the connection ID that is managed by the virtual connection server section 205 is recorded in the format of log information, database or the like, for example. Data reading and wiring can be made freely on the storage section 209 by the communication section 201, the connection server section 203, the virtual connection server section 205, the application execution section 207 and so on.

Although the case where the remote server 20 includes the connection server section 203 is described above, the remote server 20 may include a connection client section like the one placed in the information processing unit 10.

One example of the functions of the remote server 20 according to the embodiment is described in the foregoing. Each of the above-described elements may be configured using a general-purpose member or circuit, or it may be configured by hardware specialized to the function of each element. Further, the function of each element may be entirely realized by CPU or the like. It is thereby possible to change the configuration to use as appropriate according to the technique level when implementing the embodiment.

[Processing Sections Placed in the Information Processing Unit and the Remote Server]

Figure 3:
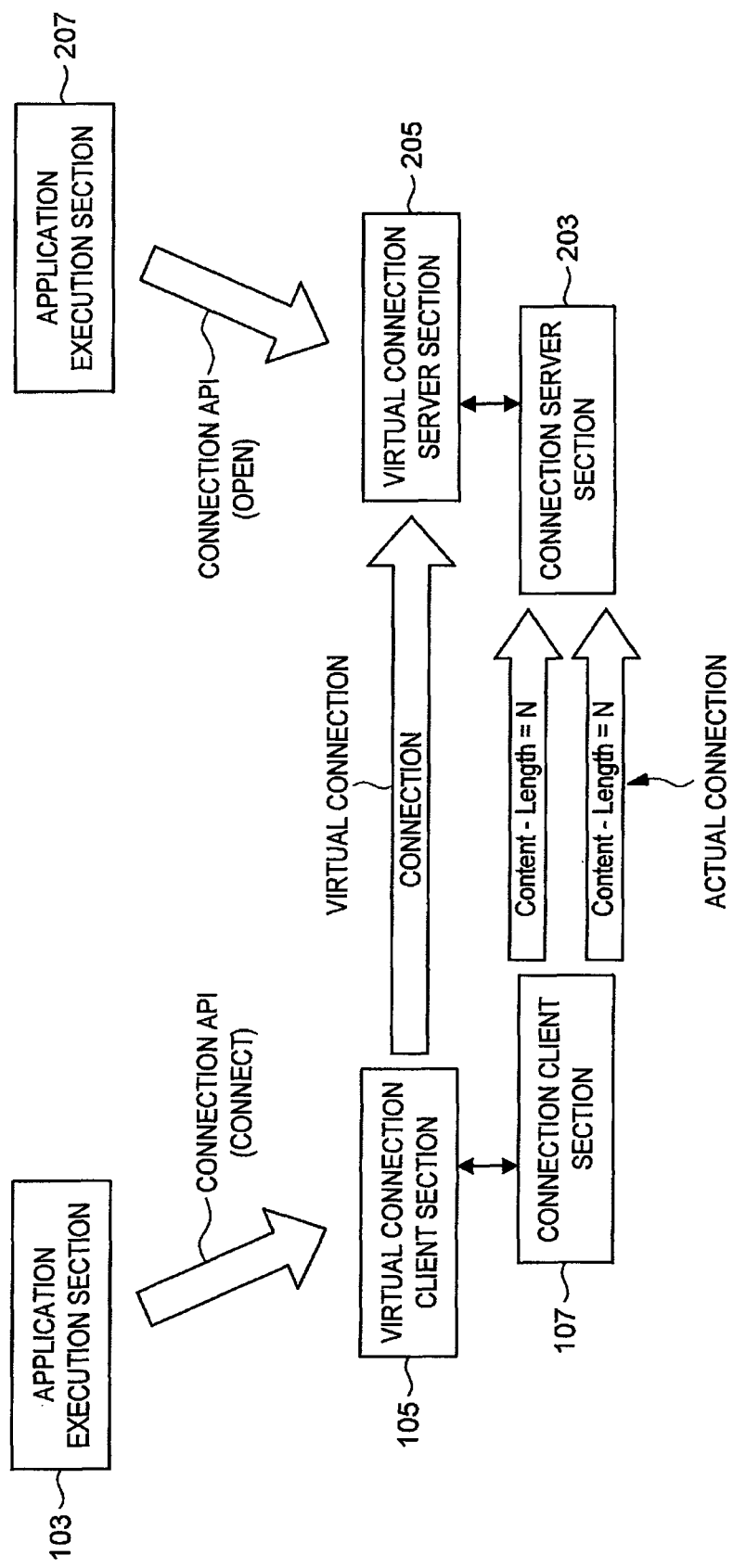
FIG. 3 is an explanatory view illustrating the configurations of an information processing unit and a remote server according to the embodiment.
Figure 4:
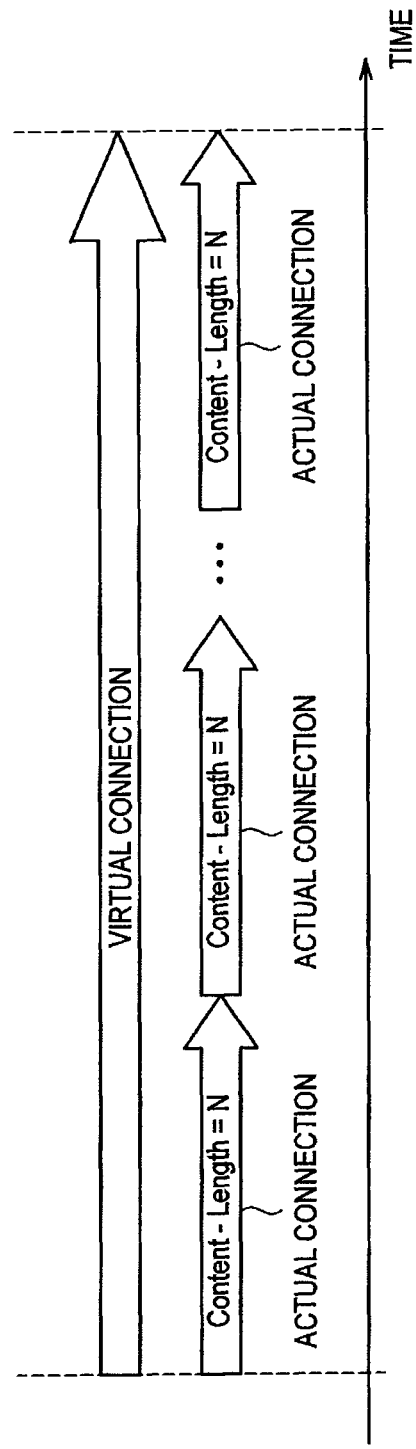
FIG. 4 is an explanatory view illustrating the configurations of an information processing unit and a remote server according to the embodiment.

The relationship of the processing sections placed in the information processing unit 10 and the remote server 20 is described hereinafter based on the concept of layers with reference to FIGS. 3 and 4. FIGS. 3 and 4 are explanatory views illustrating the configurations of the information processing unit and the remote server according to the embodiment.

The connection client section 107 of the information processing unit 10 and the connection server section 203 of the remote server 20 are connected by HTTP tunneling with a specified content length as shown in FIG. 3, for example. The actual HTTP tunneling connection with a specified content length is referred to hereinafter as a real connection. In the example of FIG. 3, the content length is determined to be "N" between the connection client section 107 and the connection server section 203.

When the content length N is completed and the real connection is closed, the connection client section 107 supplies a request for updating the real connection with the content length N again to the connection server section 203, and the real connection is updated. Accordingly, a plurality of real connections each having the content length N are established in succession between the connection client section 107 and the connection server section 203 as shown in FIG. 4.

The virtual connection client section 105 is placed in the upper layer of the connection client section 107 as shown in FIG. 3, and it controls the connection client section 107. Specifically, the virtual connection client section 105 treats a set of a plurality of real connections as shown in FIGS. 3 and 4 as one virtual connection by HTTP tunneling so as to make the application execution section 103 recognize the virtual connection as an available connection. The virtual HTTP tunneling connection is referred to hereinafter as a virtual connection.

On the other hand, the virtual connection server section 205 is placed in the upper layer of the connection server section 203 as shown in FIG. 3, and it controls the connection server section 203. Specifically, the virtual connection server section 205 treats a plurality of real connections as shown in FIGS. 3 and 4 as one virtual connection so as to make the application execution section 207 recognize the virtual connection as an available connection.

Further, the application execution section 103 is placed in the upper layer of the virtual connection client section 105 as shown in FIG. 3, and the application execution section 207 is placed in the upper layer of the virtual connection server section 205 as shown in FIG. 3. The application execution sections 103 and 207 are the uppermost layers. The upper layer applications that are executed in the respective application execution sections are made to recognize that one virtual connection provided from the virtual connection client section 105 or the virtual connection server section 205, which is the lower layer, is an available connection. Therefore, the application execution section uses the virtual connection client section or the virtual connection server section as a connection without concern for the way the real connection is realized.

For example, if the "Connect" function is selected from connection application program interface (API) by the application execution section 103 of the information processing unit 10, which is the uppermost layer, the application execution section 103 requests initiation of a connection to the virtual connection client section 105, which is a lower layer. In response to the request from the application execution section 103, the virtual connection client section 105 establishes a virtual connection and notifies that to the application execution section 103.

In an actual operation, the virtual connection client section 105 requests establishment of a real connection to the connection client section 107, which is the yet lower layer, and the connection client section 107 establishes a real connection with the connection server section 203, which is the lowermost layer of the remote server 20.

When the content length N is completed, the real connection is updated between the connection client section 107 and the connection server section 203, which are the lowermost layers, and consequently a plurality of real connections exist as shown in FIG. 4. However, because they exist in the layer between the application execution section 103 and the connection client section 107, the application execution section 103 can execute the application without being aware that the real connection is updated.

Such hierarchical processing is performed in the same manner in the remote server 20 as well.

As described above, in the information processing system 1 according to the embodiment, a processing section that manages actual HTTP tunneling is placed as an intermediate layer between a processing section that functions to execute an application as the uppermost layer, and a processing section that functions to establish and maintain actual HTTP tunneling as the lowermost layer. With the presence of the intermediate layer, the application execution section serving as the uppermost layer can use the connection without grasping the amount of transfer data (i.e. the content length).

There may be a case where the information processing unit 10 or the remote server 20 according to the embodiment is installed in the environment where an HTTP tunneling connection can be realized without placing a connection management section such as the virtual connection client section or the virtual connection server section according to the embodiment. In such a case, the connection management section may simply pass a service that is provided from the connection client section or the connection server section to the application execution section, which is the upper layer application, without performing the above-described processing.

<Information Processing Method>

Figure 5B:
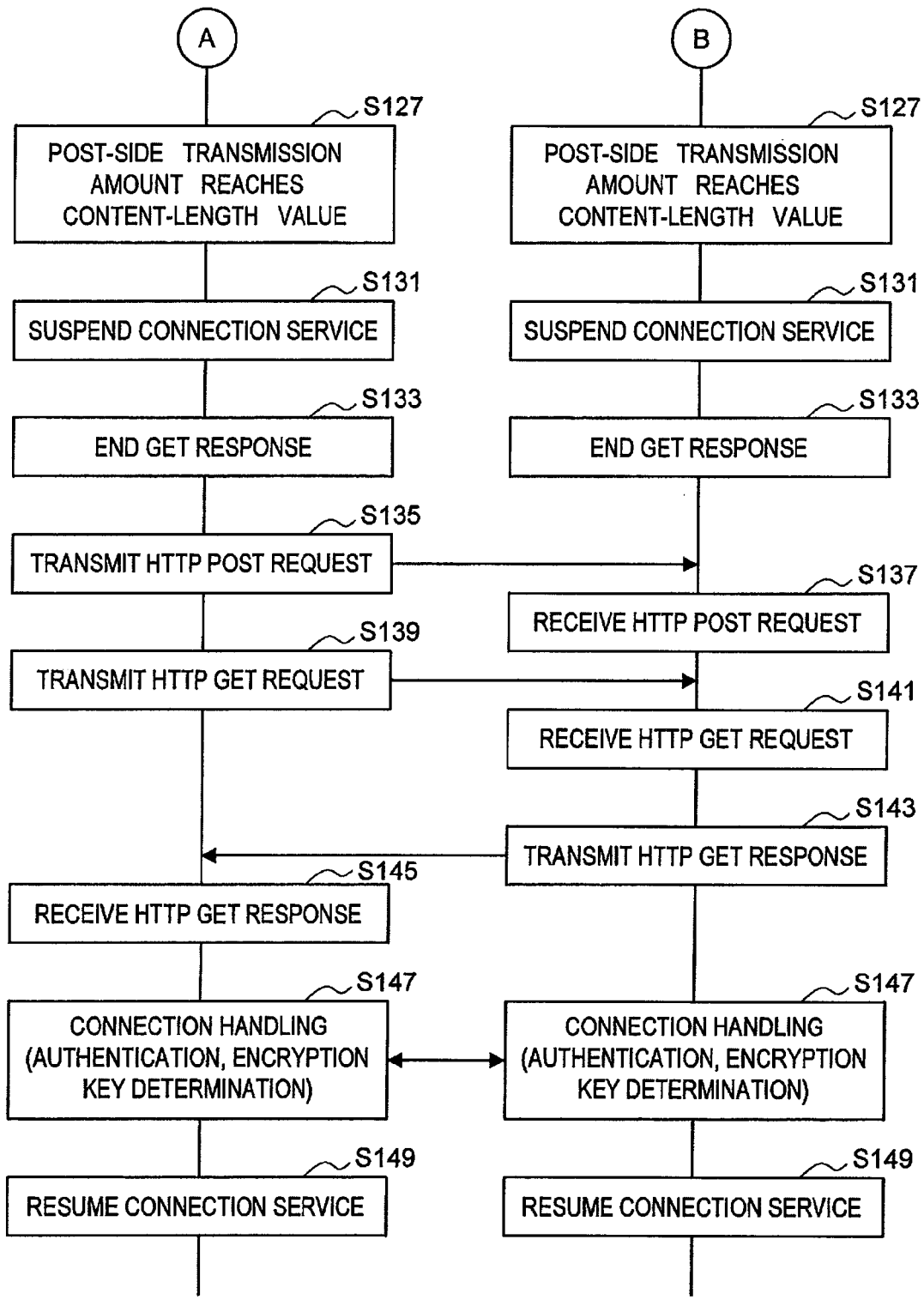
FIG. 5B is a flowchart illustrating an information processing method according to the embodiment.

An information processing method according to the embodiment is described hereinafter with reference to FIGS. 5A to 5B. FIGS. 5A to 5B are flowcharts illustrating the information processing method according to the embodiment.

Firstly, the application execution section 207 of the remote server 20 selects "Open" from connection API and requests start of a connection service (step S101). Then, an HTTP server is activated (step S103) to wait for a connection establish request to be supplied from the information processing unit 10.

On the other hand, the application execution section 103 of the information processing unit 10 selects "Connect" from connection API and requests start of a connection service (step S105). Then, the connection client section 107 sets a new connection ID (step S107). The connection ID is recorded in the storage section 109 in associated with a generated date and time or the like, for example.

Next, if the proxy server 9 that does not support the method using chunked encoding exists, the connection client section 107 determines a content length with the connection server section 203 of the remote server 20 (step S109) and describes it in a content length header. The content length is determined to be a maximum transfer amount N that can be set between the information processing unit 10 and the remote server 20. Although the maximum transfer amount N is preferably a large value, a too large value would be rejected by the proxy server 9 (HTTP proxy). Thus, an appropriate value can be determined by an actual attempt.

The connection client section 107 of the information processing unit 10 transmits an HTTP POST request to the connection server section 203 of the remote server 20 (step S111). In the destination URL of the HTTP POST request, the connection ID that is issued by the information processing unit 10 and a global unique ID (GUID) that identifies the information processing unit 10 are described using a query string. The HTTP POST request is transmitted without terminating its body. The connection server section 203 of the remote server 20 then receives the transmitted HTTP POST request (step S113).

After that, the connection client section 107 of the information processing unit 10 transmits an HTTP GET request to the connection server section 203 of the remote server 20 (step S115). In the destination URL of the HTTP GET request also, the connection ID that is issued by the information processing unit 10 and a global unique ID (GUID) that identifies the information processing unit 10 are described using a query string. The connection server section 203 of the remote server 20 then receives the transmitted HTTP GET request (step S117).

The connection server section 203 of the remote server 20 treats a pair of POST and GET in which both of the connection ID and GUID contained in the received URL match with each other as an HTTP transaction that forms one HTTP tunneling. Then, the connection server section 203 of the remote server 20 transmits an HTTP GET response to the information processing unit 10 (step S119) without terminating its body. The connection client section 107 of the information processing unit 10 then receives the transmitted HTTP GET response (step S121).

The information processing unit 10 and the remote server 20 use the body of the POST request and the body of the GET response as two-way communication channels. When the communication channels are established, the connection client section 107 of the information processing unit 10 and the connection server section 203 of the remote server 20 each perform connection handling by carrying out two-way authentication and determination of the encryption key to be used in the subsequent communication (step S123). By such processing, a real connection is established between the information processing unit 10 and the remote server 20.

When the real connection is established, the virtual connection client section 105 and the virtual connection server section 205, which are upper layers, start management of the connection and provide a connection service to the application execution sections 103 and 207 (step S125).

As a result of communication by HTTP tunneling using the HTTP POST request, a transmission amount in the POST request body reaches N at a certain point (step S127). At this point, the virtual connection client section 105 of the information processing unit 10 temporarily suspends execution of the connection service to the application execution section 103 (step S131). During the suspension, the virtual connection client section 105 accepts a connection service execution request from the application execution section 103 but suspends execution until resumption. As a result of such an operation, the application execution section 103 has no concern for the suspension.

The virtual connection client section 105 temporarily terminates HTTP tunneling. The HTTP transaction on the POST side ends at the point when the transmission amount reaches N without any particular operation on the network. However, the virtual connection client section 105 may disconnect the TCP connection via the communication section 101. Further, the virtual connection client section 105 of the information processing unit 10 also ends the transaction on the GET side upon interruption of the transaction on the POST side (step S133). The transaction may be ended by the virtual connection client section 105 disconnecting the TCP connection via the communication section 101.

In the case of using the method by chunked encoding, the transaction may be ended when the remote server 20 ends the currently transmitted chunk using dummy date and then specifies the next chunk size to 0. Although it is not necessary to disconnect the TCP connection after 0 chunk when using the method by chunked encoding, the TCP connection may be disconnected.

When the connection is terminated after reaching the content length value, the virtual connection server section 205 of the remote server 20 suspends a connection service to the application execution section 207 in the same manner as in the information processing unit 10 (step S131). The virtual connection server section 205 stores the GUID of the information processing unit 10 and the connection ID, which have been specified at the time of establishing the connection, for a given length of time. The given length of time is previously set according to an agreement between the virtual connection client section 105 and the virtual connection server section 205. If resumption (i.e. connection updating) is not performed for the given length of time, the virtual connection client section 105 of the information processing unit 10 and the virtual connection server section 205 of the remote server 20 notify the application execution sections 103 and 207, respectively, that the virtual connection has been lost.

The virtual connection client section 105 of the information processing unit 10 resumes the HTTP tunneling before the given length of time elapses. Specifically, the virtual connection client section 105 acquires the connection ID that has been used for the first HTTP tunneling and provides it to the connection client section 107. The connection client section 107 transmits the HTTP POST request to the remote server 20 by reusing the provided connection ID and the GUID of the client (step S135). The HTTP POST request is transmitted without terminating its body. The connection server section 203 of the remote server 20 then receives the transmitted HTTP POST request (step S137).

Likewise, the connection client section 107 of the information processing unit 10 transmits the HTTP GET request to the connection server section 203 of the remote server 20 (step S139). In the destination URL of the HTTP GET request also, the connection ID that is provided from the connection client section 107 and the GUID that identifies the information processing unit 10 are described using a query string. The connection server section 203 of the remote server 20 then receives the transmitted HTTP GET request (step S147).

The connection server section 203 of the remote server 20 checks the received GUID of the information processing unit 10 and the connection ID and recognizes that HTTP GET and POST are continued from the previous transaction. The connection server section 203 of the remote server 20 transmits an HTTP GET response to the information processing unit 10 (step S143) without terminating its body. The connection client section 107 of the information processing unit 10 then receives the transmitted HTTP GET response (step S145).

The information processing unit 10 and the remote server 20 use the body of the POST request and the body of the GET response as two-way communication channels. When the communication channels are established, the connection client section 107 of the information processing unit 10 and the connection server section 203 of the remote server 20 each perform connection handling by carrying out two-way authentication and determination of the encryption key to be used in the subsequent communication (step S147). By such processing, a real connection is established between the information processing unit 10 and the remote server 20.

After that, the virtual connection client section 105 and the virtual connection server section 205 resume execution of the connection service that has been requested from the application execution section (step S149).

Some processing in the connection handling at the time of resumption (connection updating) may be simplified. For example, in the step S147, only two-way authentication may be performed and the same encryption key as that in the previous connection may be used. By performing such processing, it is possible to end connection handling quickly.

As described in the foregoing, the information processing method according to the embodiment can maintain and use the connection without grasping the amount of transfer data (i.e. the content length).

<Reverse Connection>

Figure 7:
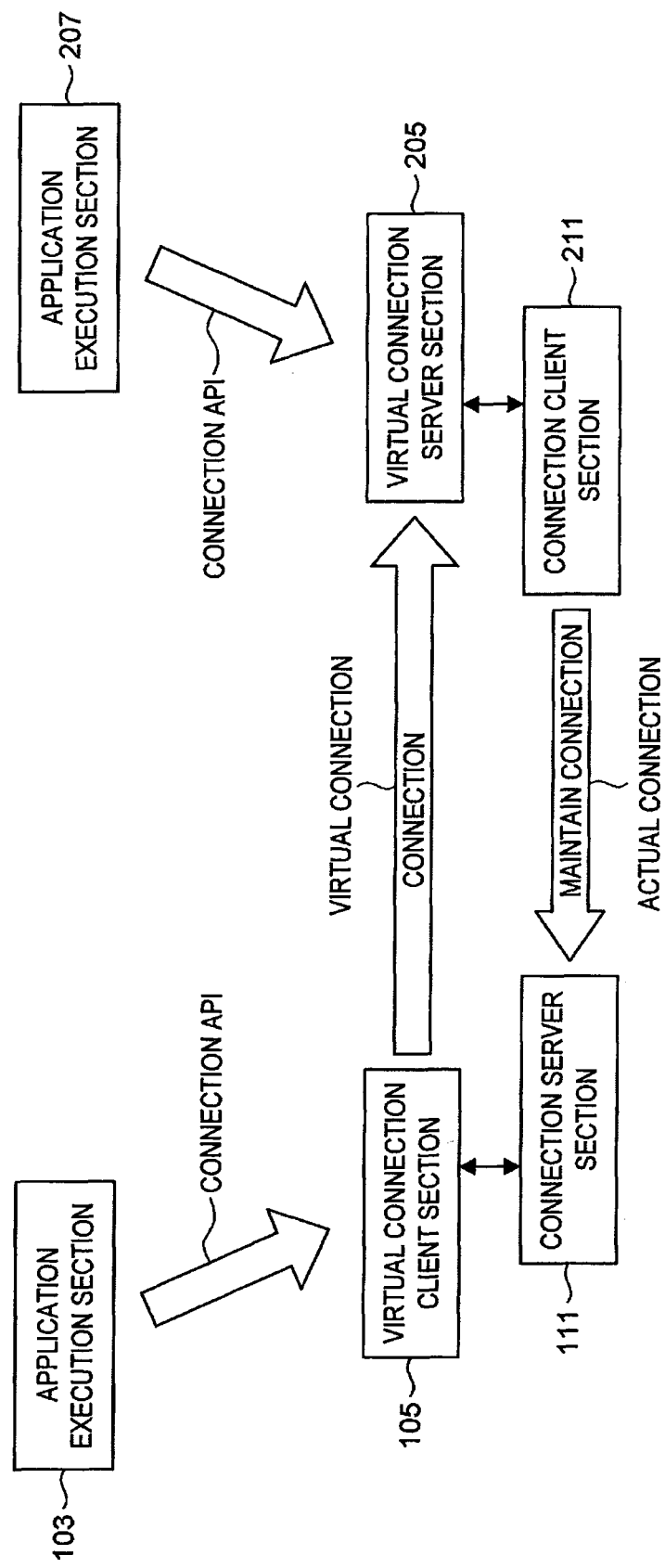
FIG. 7 is an explanatory view illustrating a reverse connection according to the embodiment.

A reverse connection that can be realized by placing the connection management section according to the embodiment is described hereinafter in detail with reference to FIGS. 6 and 7. FIGS. 6 and 7 are explanatory views illustrating a reverse connection according to the embodiment.

A reverse connection function, which is described below, is a function that can be implemented by placing the connection management section according to the embodiment. A reverse connection indicates a connection in which the direction of a connection that is assumed by the application and the direction of a connection using HTTP tunneling that is actually established are opposite to each other.

In the communication of an application, the function at the end of initiating communication and the function at the end of awaiting it are determined in some cases. However, whether an actual connection can be established may not be the same as assumed by the application depending on the implementation of a device to be used for communication and the network environment.

In such a case, consider, particularly, the case where the initiator of the application (i.e. the information processing unit 10) satisfies requirements for the server side of a real connection but the server of the application (i.e. the remote server 20) does not satisfy requirements for the server side of a real connection. Because requirements for the client side (i.e. the information processing unit 10) are generally lower than requirements for the server side, it is assumed that the server of the application (i.e. the remote server 20) satisfies requirements for the client side of a connection.

In the above case, a connection server section 111, like the one included in the remote server 20 of the embodiment, is placed in the client side (i.e. the information processing unit 10), and a connection client section 211, like the one included in the information processing unit 10 of the embodiment, is placed in the remote server side as shown in FIG. 6, for example. As a result, it is possible to establish and maintain a real connection from the connection client section 211 to the connection server section 111 as shown in FIG. 6.

Further, the virtual connection client section 105 is placed in the initiator side of an application (i.e. the information processing unit 10), and the virtual connection server section 205 is placed in the server side of an application (i.e. the remote server 20) as shown in FIG. 7, for example. The application execution sections 103 and 207 in the respective units recognize the virtual connection client section 105 and the virtual connection server section 205 as a normal connection client section and a normal connection server section, respectively. The virtual connection client section 105 makes setting so as to establish a virtual connection toward the virtual connection server section 205, thereby making the application execution section recognize that a connection is established in the direction from the initiator to the server.

On the other hand, in response to a request from the application execution sections, the virtual connection client section 105 and the virtual connection server section 205 cause the connection server section 111 and the connection client section 211, which are placed respectively in the lower layers, to establish a real connection in the direction from the remote server 20 to the information processing unit 10 as the initiator. Then, the virtual connection client section 105 and the virtual connection server section 205 manage the connection status of the real connection in the reverse direction.

As described above, by placing the connection management section according to the embodiment, even in the case where the direction of a connection assumed by the application execution section and the direction of a connection actually established are opposite, the application execution section of each unit can perform communication without concern for the direction of a connection.

<Hardware Configuration>

Figure 8:
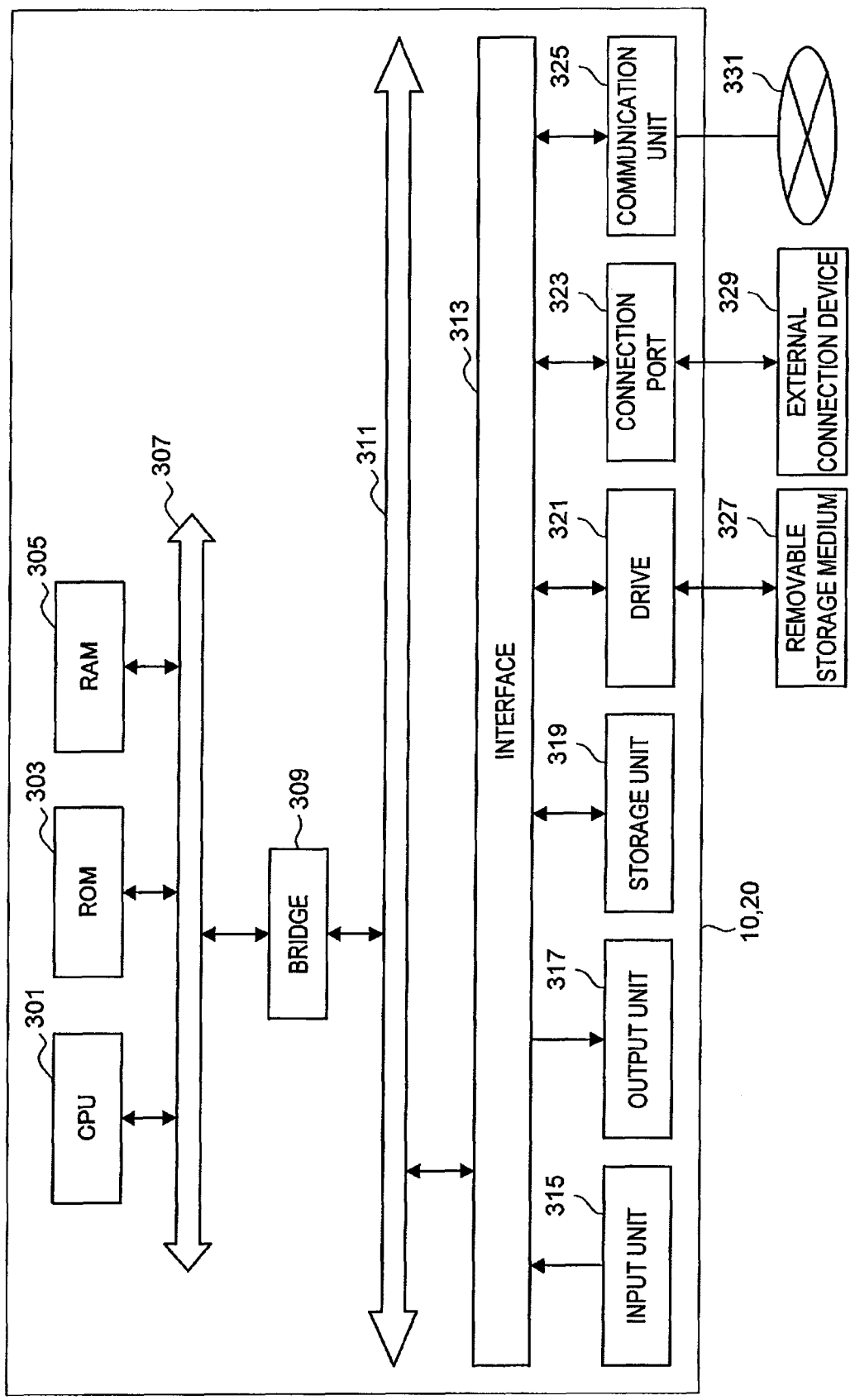
FIG. 8 is a block diagram illustrating the hardware configuration of an information processing unit according to the embodiment.

The hardware configuration of the information processing unit 10 according to the embodiment of the present invention is described hereinafter in detail with reference to FIG. 8. FIG. 8 is a block diagram illustrating the hardware configuration of the information processing unit 10 according to the embodiment.

The information processing unit 10 mainly includes a CPU 301, a ROM 303, a RAM 305, a host bus 307, a bridge 309, an external bus 311, an interface 313, an input unit 315, an output unit 317, a storage unit 319, a drive 321, a connection port 323, and a communication unit 325.

The CPU 301 serves as a processing unit and a control unit, and it controls the whole or part of operation in the information processing unit 10 according to programs stored in the ROM 303, the RAM 305, the storage unit 319 or a removable recording medium 327. The ROM 303 stores a program to be used by the CPU 301, a processing parameter and so on. The RAM 305 primarily stores a program to be used in the execution on the CPU 301, a parameter that varies in the execution and so on. The CPU 301, the ROM 303 and the RAM 305 are connected with each other through the host bus 307, which may be an internal bus such as a CPU bus.

The host bus 307 is connected to the external bus 311 such as a peripheral component interconnect/interface (PCI) bus via the bridge 309.

The input unit 315 is an operating means to be operated by a user, such as a mouse, a keyboard, a touch panel, a button, a switch or a lever, for example. The input unit 315 may be a remote controlling means (or a remote control) using an infrared ray or another radio wave, or an external connection device 329 corresponding to the operation of the information processing unit 10, such as a cellular phone or a PDA. Further, the input unit 315 includes an input control circuit that generates an input signal based on information input by a user using the above operating means and outputs it to the CPU 301, for example. A user of the information processing unit 10 manipulates the input unit 315 to thereby input various data or direct processing operation to the information processing unit 10.

The output unit 317 includes a display device such as a CRT display device, a liquid crystal display device, a plasma display device, an EL display device or a lamp, an audio output device such as a speaker or a headphone, and a device for visually or auditorily presenting acquired information to a user such as a printer, a cellular phone or a facsimile, for example. The output unit 317 outputs a result obtained by processing of the information processing unit 10, for example. Specifically, the display device displays a result obtained by processing of the information processing unit 10 by a text or an image. The audio output device converts an audio signal containing reproduced audio data, acoustic data and so on into an analog signal and outputs it.

The storage unit 319 is a device for data storage that is configured as an example of a storage section of the information processing unit 10. The storage unit 319 may be configured by a magnetic storage device such as a hard disk drive (HDD), a semiconductor storage device, an optical storage device, a magneto-optical storage device or the like. The storage unit 319 stores a program to be executed by the CPU 301, various data, acoustic signal data or image signal data acquired from the outside, and so on.

The drive 321 is a reader/writer for a storage medium, which is built in the information processing unit 10 or attached externally. The drive 321 reads information that is recorded in the removable storage medium 327 such as a magnetic disk, an optical disk, a magneto-optical disk or a semiconductor memory which is attached thereto and outputs the information to the RAM 305. Further, the drive 321 can write information into the removable storage medium 327 such as a magnetic disk, an optical disk, a magneto-optical disk or a semiconductor memory which is attached thereto. The removable storage medium 327 may be a DVD medium, an HD-DVD medium, a Blu-ray medium, a compact flash (CF) (registered trademark), a memory stick, a secure digital (SD) memory card or the like. Further, the removable storage medium 327 may be an integrated circuit (IC) card or an electronic device with a contactless IC chip mounted thereon.

The connection port 323 is a port for directly connecting a device to the information processing unit 10, such as a universal serial bus (USB) port, an IEEE 1394 port such as i.Link, a small computer system interface (SCSI) port, an RS-232C port, an optical audio terminal, or a high-definition multimedia interface (HDMI) port. By connecting the external connection device 329 to the connection port 323, the information processing unit 10 can directly acquire acoustic signal data and image signal data from the external connection device 329 or supply acoustic signal data and image signal data to the external connection device 329.

The communication unit 325 is a communication interface that is configured by a communication device or the like for establishing a connection with 1 communication network 331, for example. The communication unit 325 may be a communication card for wired or wireless local area network (LAN), Bluetooth or wireless USB (WUSB), a router for optical communication, a router for asymmetric digital subscriber line (ADSL) or a modem for various kinds of communications, for example. The communication unit 325 can transmit and receive an acoustic signal or the like to and from the Internet or another communication device. Further, the communication network 331 connected to the communication unit 325 is configured by a network or the like connected by wired or wireless means, and it may be the Internet, home LAN, infrared data communication, radio wave communication, satellite communication and so on.

One example of the hardware configuration capable of implementing the functions of the information processing unit 10 according to the embodiment of the present invention is described in the foregoing. Each of the above-described elements may be configured using a general-purpose member or circuit, or it may be configured by hardware specialized to the function of each element. It is thereby possible to change the hardware configuration to use as appropriate according to the technique level when implementing the embodiment.

The remote server 20 according to the embodiment of the present invention has substantially the same hardware configuration as the information processing unit 10 according to the embodiment of the present invention, and therefore repeated explanation is omitted.

The information processing unit 10 according to the embodiment of the present invention may be provided as a program having the following functions. The program causes a computer to function as an information processing unit that can communicate with a connection target unit connected via a proxy server and causes the computer to implement an application execution function to execute an application to request establishment of an HTTP tunneling connection with the connection target unit, a connection establishment function to set a maximum content length that can be set with the connection target unit, establish an HTTP tunneling connection with the specified content length with the connection target unit via the proxy server connected thereto and update the HTTP tunneling connection with the specified content length a plurality of times upon closure of the established connection, and a connection management function to manage connection status of each of a plurality of HTTP tunneling connections and make the application recognize the plurality of HTTP tunneling connections as one virtual HTTP tunneling connection.

The computer program is stored in a storage section included in the computer, and it is read by a CPU included in the computer and executed, thereby causing the computer to function as the information processing unit 10 described above. There is also provided a computer readable recording medium in which the computer program is stored. The recording medium may be a magnetic disk, an optical disk, a magneto-optical disk, flash memory and so on, for example. The computer program may be distributed through a network, for example, without use of a recording medium.

Further, the remote server 20 according to the embodiment of the present invention may be provided as a program having the following functions. The program causes a computer to function as a remote server that can communicate with an information processing unit connected to a proxy server and causes the computer to implement an application execution function to execute an application to await a request for establishment of an HTTP tunneling connection supplied from the information processing unit, a connection establishment function to supply a maximum content length that can be set to the information processing unit, establish an HTTP tunneling connection with the specified content length with the information processing unit connected via the proxy server and re-establish the connection when a request for update of the connection is supplied from the information processing unit upon closure of the established connection, and a connection management function to manage connection status of a plurality of HTTP tunneling connections and make the application recognize the plurality of HTTP tunneling connections as one virtual HTTP tunneling connection.

The computer program is stored in a storage section included in the computer, and it is read by a CPU included in the computer and executed, thereby causing the computer to function as the remote server 20 described above. There is also provided a computer readable recording medium in which the computer program is stored. The recording medium may be a magnetic disk, an optical disk, a magneto-optical disk, flash memory and so on, for example. The computer program may be distributed through a network, for example, without use of a recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing unit comprising:
    a hardware application execution section to execute an application to request establishment of an HTTP tunneling connection with a connection target unit;
    a hardware connection management section to manage a connection identifier corresponding to a virtual HTTP tunneling connection;
    a hardware connection establishment section configured to:
        set a maximum content length settable with the connection target unit;
        establish an actual HTTP tunneling connection with a specified content length with the connection target unit via a connected proxy server;
        assign the connection identifier corresponding to the virtual HTTP tunneling connection to the actual HTTP tunneling connection with the specified content length;
        update the actual HTTP tunneling connection with the specified content length when the established actual HTTP tunneling connection is closed due to an amount of data transmitted exceeds the specified content length; and
        assign a same connection identifier as the connection identifier corresponding to the virtual HTTP tunneling connection to the updated actual HTTP tunneling connection with the specified content length; and
    the hardware connection management section is configured to manage connection status of the actual HTTP tunneling connection and one or more updated actual HTTP tunneling connections and make the hardware application execution section recognize the actual HTTP tunneling connection and the one or more updated actual HTTP tunneling connections as the virtual HTTP tunneling connection by associating the actual HTTP tunneling connection and one or more updated actual HTTP tunneling connections with the virtual HTTP tunneling connection through the connection identifier.

2. The information processing unit according to claim 1, wherein:
    the hardware connection management section manages the connection identifier to be associated with the virtual HTTP tunneling connection and specifies the connection identifier associated with the virtual HTTP tunneling connection to the connection establishment section when the connection establishment section updates the actual HTTP tunneling connection with the specified content length; and the hardware connection establishment section updates the actual HTTP tunneling connection using the connection identifier specified by the hardware connection management section.

3. The information processing unit according to claim 2, wherein the hardware connection establishment section updates the actual HTTP tunneling connection with the specified content length by reusing a connection control condition set for the actual HTTP tunneling connection before updating the actual HTTP tunneling connection.

4. An information processing method comprising the steps of:

setting a maximum content length settable with a connection target unit based on a request from an application for establishment of an HTTP tunneling connection with the connection target unit and establishing an actual HTTP tunneling connection with a specified content length with the connection target unit via a connected proxy server;

managing a connection identifier corresponding to a virtual HTTP tunneling connection;

assigning the connection identifier to the actual HTTP tunneling connection with the specified content length;

updating the actual HTTP tunneling connection with the specified content length when the established actual HTTP tunneling connection is closed due to an amount of data transmitted exceeds the specified content length;

assigning a same connection identifier as the connection identifier corresponding to the virtual HTTP tunneling connection to the updated actual HTTP tunneling connection with the specified content length; and managing connection status of the actual HTTP tunneling connection and one or more updated actual HTTP tunneling connections and making the application recognize the actual HTTP tunneling connection and the one or more updated actual HTTP tunneling connections as the virtual HTTP tunneling connection by associating the actual HTTP tunneling connection and one or more updated actual HTTP tunneling connections with the virtual HTTP tunneling connection through the connection identifier.

5. A remote server comprising:

a hardware application execution section to execute an application to await a request for establishment of an HTTP tunneling connection supplied from an information processing unit;

a hardware connection management section to manage a connection identifier corresponding to a virtual HTTP tunneling connection;

a hardware connection establishment section configured to:

supply a maximum content length settable to the information processing unit;

establish an actual HTTP tunneling connection with a specified content length with the information processing unit connected via a proxy server;

assign the connection identifier corresponding to the virtual HTTP tunneling connection to the actual HTTP tunneling connection with the specified content length;

re-establish the actual HTTP tunneling connection with the specified content length when a request for update of the actual HTTP tunneling connection is supplied from the information processing unit when the established actual HTTP tunneling connection is closed due to an amount of data transmitted exceeds the specified content length; and assign a same connection identifier as the connection identifier corresponding to the virtual HTTP tunneling connection to the re-established actual HTTP tunneling connection with the specified content length; and the hardware connection management section is configured to manage connection status of the actual HTTP tunneling connection and one or more re-established actual HTTP tunneling connections and make the hardware application execution section recognize the actual HTTP tunneling connection and the one or more re-established actual HTTP tunneling connections as the virtual HTTP tunneling connection by associating the actual HTTP tunneling connection and one or more re-established actual HTTP tunneling connections with the virtual HTTP tunneling connection through the connection identifier.

6. An information processing method comprising the steps of:

executing an application to await a request for establishment of an HTTP tunneling connection supplied from an information processing unit;

manage a connection identifier corresponding to a virtual HTTP tunneling connection;

supplying a maximum content length settable to the information processing unit and establishing an actual HTTP tunneling connection with a specified content length with the information processing unit connected via a proxy server;

assigning the connection identifier to the actual HTTP tunneling connection with the specified content length;

re-establishing the actual HTTP tunneling connection when a request for update of the actual HTTP tunneling connection is supplied from the information processing unit when the established actual HTTP tunneling connection is closed due to an amount of data transmitted exceeds the specified content length;

assigning a same connection identifier as the connection identifier corresponding to the virtual HTTP tunneling connection to the re- established actual HTTP tunneling connection with the specified content length; and managing connection status of the actual HTTP tunneling connection and one or more re-established actual HTTP tunneling connections and making the application recognize the actual HTTP tunneling connection and the one or more re-established actual HTTP tunneling connections as the virtual HTTP tunneling connection by associating the actual HTTP tunneling connection and one or more updated actual HTTP tunneling connections with the virtual HTTP tunneling connection through the connection identifier.

7. An information processing system comprising:

a hardware information processing unit including:

a hardware application execution section to execute an application to request establishment of an HTTP tunneling connection with a remote server;

a hardware connection management section to manage a connection identifier corresponding to a virtual HTTP tunneling connection;

a hardware connection establishment section configured to:

set a maximum content length settable with the remote server; establish an actual HTTP tunneling connection with a specified content length with the remote server via a connected proxy server;

assign the connection identifier corresponding to the virtual HTTP tunneling connection to the actual HTTP tunneling connection with the specified content length;

update the actual HTTP tunneling connection with the specified content length when the established actual HTTP tunneling connection is closed due to an amount of data transmitted exceeds the specified content length; and assign a same connection identifier as the connection identifier corresponding to the virtual HTTP tunneling connection to the re-established actual HTTP tunneling connection with the specified content length; and the hardware connection management section is configured to manage connection status of the actual HTTP tunneling connection and one or more updated actual HTTP tunneling connections and make the hardware application execution section recognize the actual HTTP tunneling connection and the one or more updated actual HTTP tunneling connections as the virtual HTTP tunneling connection by associating the actual HTTP tunneling connection and one or more updated actual HTTP tunneling connections with the virtual HTTP tunneling connection through the connection identifier; and the remote server including:

a server-side hardware application execution section to execute a server-side application to await a request for establishment of the HTTP tunneling connection supplied from the information processing unit;

a server-side hardware connection establishment section configured to:

supply the maximum content length settable to the information processing unit;

establish the actual HTTP tunneling connection with the specified content length with the information processing unit connected via the proxy server; and re-establish the actual HTTP tunneling connection when a request for update of the actual HTTP tunneling connection is supplied from the information processing unit when the established actual HTTP tunneling connection is closed due to the amount of data transmitted exceeded the specified content length; and a server-side hardware connection management section to manage connection status of the actual HTTP tunneling connection and one or more re-established actual HTTP tunneling connections and make the server-side hardware application execution section recognize the actual HTTP tunneling connection and the one or more re-established actual HTTP tunneling connection as the virtual HTTP tunneling connection.

8. The information processing system according to claim 7, wherein:

the virtual HTTP tunneling connection is established from the information processing unit to the remote server; and the actual HTTP tunneling connection and the one or more re-established actual HTTP tunneling connections are established from the remote server to the information processing unit.

* * * * *